US012683524B2

(12) United States Patent
Augustin et al.

(10) Patent No.: US 12,683,524 B2
(45) Date of Patent: Jul. 14, 2026

(54) CONTROL METHOD FOR BRAKING AN ELECTRIC MOTOR, CONTROL METHOD FOR CONTROLLING AN ELECTRIC DRIVE UNIT AND COMPUTER PROGRAM PRODUCT

(71) Applicant: Hilti Aktiengesellschaft, Schaan (LI)

(72) Inventors: Christian Augustin, Poettmes (DE);
Xiaodong Zhang, Munich (DE);
Walter Wissmach, Munich (DE)

(73) Assignee: Hilti Aktiengesellschaft, Schaan (LI)

( * ) Notice: Subject to any disclaimer, the term of this patent is extended or adjusted under 35 U.S.C. 154(b) by 168 days.

(21) Appl. No.: 18/557,373

(22) PCT Filed: May 5, 2022

(86) PCT No.: PCT/EP2022/062219

§ 371 (c)(1),
(2) Date: Oct. 26, 2023

(87) PCT Pub. No.: WO2022/243058

PCT Pub. Date: Nov. 24, 2022

(65) Prior Publication Data

US 2024/0213894 A1      Jun. 27, 2024

(30) Foreign Application Priority Data

May 17, 2021    (EP) .................................... 21174114

(51) Int. Cl.
*H02P 3/10*          (2006.01)
*B25F 5/00*          (2006.01)
(52) U.S. Cl.
CPC . *H02P 3/10* (2013.01); *B25F 5/00* (2013.01)

(58) Field of Classification Search
CPC . B60L 7/02; B24B 23/00; B24B 55/00; B64C 13/50; H02P 3/08; H02P 8/24; H02H 7/085
See application file for complete search history.

(56) References Cited

U.S. PATENT DOCUMENTS 5,648,706 A      7/1997  Polk et al.
5,789,885 A      8/1998  See et al.
(Continued)

FOREIGN PATENT DOCUMENTS

DE          4333294 A1      4/1995
DE          19604439 A1     4/1997
(Continued)

OTHER PUBLICATIONS

WO 2022243058 A1—PCT/EP2022/062219, May 5, 2022, See translation, U.S. Appl. No. 18/557,373, filed Oct. 26, 2023.
(Continued)

*Primary Examiner* — Said Bouziane
(74) *Attorney, Agent, or Firm* — Davidson Kappel LLC

(57)          ABSTRACT

Control method for braking an electric motor (7) of an electric handheld power tool (1), the electric motor (7) including a stator winding (12) and a rotor winding (14), wherein the method includes a) switching (S1) the electric motor (7) from motor operation to braking operation, b) reversing the polarity (S2) of an input voltage applied to the rotor winding (14) compared to motor operation, c) limiting (S3) a rotor current ($I_R(t)$) of the rotor winding (14) as a function of a predetermined threshold value ($I_L$), and d) regulating (S4) a stator current ($I_S(t)$) of the stator winding (12) as a function of a current rotation speed (n(t)) of the electric motor (7).

16 Claims, 7 Drawing Sheets

(56)                    References Cited

U.S. PATENT DOCUMENTS

2009/0071673  A1       3/2009  Zhong et al.
2019/0363649  A1 *  11/2019  Duan ........................ H02P 3/14
2021/0058014  A1       2/2021  Wiker et al.

FOREIGN PATENT DOCUMENTS

DE          102013209713  A1    11/2014
EP                 3020511  A1      5/2016
WO      WO 2022243058  A1      5/2022
WO      WO 2022243059  A1      5/2022

OTHER PUBLICATIONS

WO 2022243059 A1—PCT/EP2022/062221, May 5, 2022, See
translation, U.S. Appl. No. 18/555,783, filed Oct. 17, 2023.
International Search Report of PCT/EP2022/062221 dated Sep. 16,
2022.
International Search Report of PCT/EP2022/062219 dated Sep. 16,
2022.

* cited by examiner

CONTROL METHOD FOR BRAKING AN ELECTRIC MOTOR, CONTROL METHOD FOR CONTROLLING AN ELECTRIC DRIVE UNIT AND COMPUTER PROGRAM PRODUCT

FIELD OF THE INVENTION

The present invention relates to a control method for braking an electric motor, to a control method for controlling an electric drive unit and to a computer program product.

BACKGROUND

A drilling tool of an electric handheld power tool, such as a drill, can become wedged in a substrate when drilling into it. In order to prevent the drill from rotating about its own axis when it is wedged and to prevent an operator of the drill from possibly being injured, a mechanical protective device in the form of a slip clutch is usually installed in the drill. Said slip clutch disconnects the drive from the drilling tool, the power supply to the electric motor is switched off and the electric motor runs down without endangering the operator.

SUMMARY OF THE INVENTION

If the intention is for an electronic protective device to take over this function, high braking currents are required in order to carry out this process in a few milliseconds to ensure the safety of the operator.

In order to generate a high braking current using an electronic circuit, the polarity of the voltage at the rotor winding is reversed in electric motors, for example. In an electric motor, the polarity reversal is usually carried out using a bridge circuit with TRIACs (bidirectional thyristor triodes) which is operated with an AC voltage. With this use of TRIACs, the polarity reversal can only take place during a zero crossing of the alternating current since TRIACs can only then change their state, in particular switch off. This can result in a time delay of up to 10 ms (with a period duration of a mains half-wave of 50 Hz) during the braking process. In order to still stop the motor within a predetermined period of time, the braking current has to be increased in this case. However, in the case of brush-operated electric motors, this leads to significantly higher carbon brush wear. In addition, when using TRIACs, the currents occurring in the electric motor cannot be regulated when reversing the polarity of the rotor voltage.

Against this background, one object of the present invention is to propose an improved control method for an electric handheld power tool.

A first aspect proposes a control method for braking an electric motor of an electric handheld power tool. The electric motor comprises a stator winding and a rotor winding. In a first step, the electric motor is switched from motor operation to braking operation. In a second step, the polarity of an input voltage applied to the rotor winding is reversed compared to motor operation. In a third step, a rotor current of the rotor winding is limited as a function of a predetermined threshold value. In a fourth step, a stator current of the stator winding is regulated as a function of a current rotation speed of the electric motor.

This method has the advantage that, during a braking process of the electric motor, the rotor current and the stator current of the electric motor can be set precisely and independently of one another.

As a result, the rotor current can advantageously be limited to a predetermined current level and the stator current can be regulated independently of this, so that it is possible to brake the electric motor within a prespecified time period, but with a high braking torque, in a way that protects the carbon brushes. At the same time, due to the limited rotor current and the adjustable stator current, brush sparking and heating of the electric motor can be reduced. As a result, carbon brush wear of the electric motor can be reduced. This leads to longer maintenance intervals for the electric motor and thus to an increased service life of the electric motor of the electric handheld power tool.

The electric motor comprises an electric motor with brushes, preferably a universal motor or an all-current motor.

The electric handheld power tool is, for example, in the form of a drill, a hammer drill, a saw, a mixer, a grinder, a cut-off grinder or the like. The electric handheld power tool can be operated in particular using a cable. As an alternative, the electric handheld power tool can have a receiving bay for receiving a rechargeable battery which supplies said electric handheld power tool with energy.

The electric motor comprises, in particular, a stator having at least the stator winding and a rotor having at least the rotor winding. The stator winding can be referred to as a field winding of the electric motor, while the rotor winding can be referred to as an armature winding of the electric motor. In particular, the stator winding has a non-reactive resistance and an inductance, and the rotor winding likewise has a non-reactive resistance and an inductance. The respective non-reactive resistance is preferably as small as possible. When a voltage is applied to the stator winding or to the rotor winding, a current flows through the respective winding. Due to the current and the inductance, a respective magnetic field builds up. The rotor is driven or braked depending on the phase relationship between the stator and the rotor and the direction of the current flow (and therefore the direction of the magnetic field) and the respective direction of rotation of the motor. Since the rotor moves in the magnetic field of the stator, a voltage is induced in the rotor winding according to Lenz's law, as a result of which a current which counteracts the cause (change in the magnetic flux) can flow. This means that the current induced in this way for its part results in a magnetic field which opposes the magnetic field of the stator. By controlling the flow of current in the stator and in the rotor, it is therefore possible to switch over between driving the electric motor and braking the electric motor.

During motor operation, a work process, such as drilling into a substrate or a chiseling process, is preferably carried out by an operator of the electric handheld power tool. During braking operation, in particular the electric motor, and thus also a tool driven by it, is brought to a standstill. In the context of this patent application, the term "braking operation" is intended to be understood to mean that the electric motor is not in motor operation. Braking operation can also include time intervals in which the electric motor is not braked with a braking torque and can include time intervals in which a current flow through the electric motor has a driving effect. In particular, this can be the case for a short time interval directly after switching over from motor operation to braking operation.

In the third step, the rotor current is preferably limited as a function of the predetermined threshold value in such a way that the absolute value of the rotor current is less than or equal to the predetermined threshold value, that is to say does not exceed the predetermined threshold value.

The polarity reversal of the input voltage at the rotor winding $U_{in}$ in the second step is explained in particular below. The following equation (1):

$$i_{Armature} = \frac{1}{L_{Armature}} \int u_{L_{Armature}} \cdot dt, \qquad \text{equation (1)}$$

where $L_{Armature}$ represents the inductance of the rotor winding and $u_{L_{Armature}}$ represents the rotor voltage at the rotor winding, holds true for example approximately for the rotor current through the rotor winding $i_{Armature}$.
Equation (2):

$$u_{L_{Armature}} = U_{in} - U_{R_{Armature}} - U_{IND}, \qquad \text{equation (2)}$$

where $U_{in}$ is the input voltage at the rotor winding, $U_{R_{Armature}}$ is a voltage dropped across the non-reactive resistor of the rotor and $U_{IND}$ is a voltage induced at the rotor winding, holds true for the rotor voltage $u_{L_{Armature}}$ during motor operation before polarity reversal, it being possible for the voltage induced at the rotor winding to be represented by equation (3):

$$U_{IND} = c_A \cdot \Psi_E \cdot \omega, \qquad \text{equation (3)}$$

where $c_A$ represents a machine constant, $\psi_E$ represents the magnetic excitation flux generated by the stator current through the stator winding and $\omega$ represents the current rotation speed of the rotor.

The magnetic excitation flux $\psi_E$ is provided in particular in such a way that the rotating rotor moves in the magnetic excitation flux $\psi_E$. The magnetic excitation flux $\psi_E$ can also be referred to as the magnetic field of the stator winding, which is caused by the flow of the stator current through the stator winding.

Due to reversing the polarity of the input voltage at the rotor winding $U_{in}$, this has the same sign as the induced voltage $U_{IND}$, which is why the voltages are now all added up in terms of absolute value. Therefore, equation (4):

$$u_{L_{Armature}} = -U_{in} - U_{R_{Armature}} - U_{IND}, \qquad \text{equation (4)}$$

holds true for the rotor voltage $u_{L_{Armature}}$ during braking operation after the polarity reversal. As a result, a current directed opposite to the stator current through the stator winding is generated in the rotor winding. A magnetic field is therefore generated by the rotor current, which magnetic field interacts with the magnetic field generated by the stator winding in such a way that a braking torque is produced. The rotor is thus braked.

When the rotation speed of the electric motor has reached a predetermined threshold value, the electric motor is preferably completely disconnected from an energy source.

According to one embodiment of the control method, the second step is carried out as soon as the rotor current reaches or falls below a predetermined switching threshold value.

According to a further embodiment of the control method, the predetermined switching threshold value is 0 A.

When the rotor current has reached the predetermined switching threshold value in particular, the rotor current has decayed completely, and is therefore preferably 0 A.

According to a further embodiment of the control method, the second step further comprises: connecting the rotor winding in parallel with the stator winding.

In the second step, the connection in parallel preferably takes place before the polarity reversal. In particular, before the connection in parallel, the stator winding and the rotor winding of the electric motor are interconnected as in a series-wound machine whereas, after the connection in parallel, the stator winding and the rotor winding of the electric motor are interconnected as in a shunt-wound machine.

According to a further embodiment of the control method, the fourth step comprises: increasing the stator current as a function of the rotor current and/or the current rotation speed of the electric motor.

In the fourth step, the stator current is increased in particular with a drop in the current rotation speed. The braking torque can be increased by increasing the stator current.

According to a further embodiment of the control method, the fourth step is carried out after a predetermined period of time has elapsed after the second step has been carried out.

In particular, after the polarity reversal, the system waits for the predetermined period of time to elapse in a second step. The predetermined period of time is below 5 ms, preferably below 4 ms, preferably below 3 ms, preferably below 2 ms. As soon as the predetermined period of time has elapsed, the stator winding is preferably energized and the stator current can be increased. Therefore, the stator current can be regulated independently of the rotor current. This measure advantageously reduces brush sparking, as a result of which carbon brush wear is reduced.

According to a further embodiment, the control method comprises: detecting a predetermined operating state of the electric handheld power tool during motor operation of the electric motor, and braking the electric handheld power tool according to the first to fourth steps when the predetermined operating state is detected.

According to a further embodiment of the control method, the predetermined operating state comprises at least one operation interruption state, in particular wedging of a drilling tool of the electric handheld power tool.

If, for example, the drilling tool becomes wedged in a substrate, such as a reinforcement in a reinforced concrete block, during a drilling process using the electric handheld power tool, this is detected as an operation interruption state. The electric motor is then braked as described above.

According to a further embodiment, the control method further comprises: detecting the predetermined operating state by means of a sensor, in particular by means of a gyro sensor, of the electric handheld power tool.

A second aspect proposes a computer program product which comprises instructions which, when the program is executed by a computer, cause the latter to carry out the control method according to the first aspect.

A computer program product, such as for example a computer program means, can be provided or supplied, for example, as a storage medium, such as for example a memory card, USB stick, CD-ROM, DVD, or in the form of a downloadable file from a server in a network. This can be carried out, for example, in a wireless communication network by transmitting a corresponding file with the computer program product or the computer program means.

A third aspect proposes a control method for controlling an electric drive unit for an electric handheld power tool. The electric drive unit comprises an electric motor having a stator winding and a rotor winding, an actuating circuit for actuating the electric motor and a connection unit for coupling an energy source for driving the electric motor. The stator winding is connected via a first node to a stator-side first half-bridge comprising a first semiconductor component and a second semiconductor component and is connected via a second node to the rotor winding. The rotor winding is connected to a third node which is connected via a conductive component to the connection unit. The actuating circuit comprises a third semiconductor component which is connected via the second node to the rotor winding and the stator winding and is connected via a fourth node directly to the connection unit. The control method according to the third aspect has four steps:

In a first step of the control method, the first semiconductor component is moved to a non-conductive state in order to switch the electric motor from motor operation to braking operation. In a second step of the control method, the first semiconductor component and the third semiconductor component are moved to a conductive state in order to reverse the polarity of an input voltage applied to the rotor winding compared to motor operation. In a third step of the control method, the first semiconductor component is moved to a non-conductive state as a function of a predetermined threshold value for a rotor current through the rotor winding in order to limit the rotor current. In a fourth step of the control method, the first semiconductor component is alternately moved to a conductive state and to a non-conductive state in order to regulate a stator current through the stator winding as a function of a current rotation speed of the electric motor.

The targeted actuation of the respective semiconductor components of the electric drive unit according to the control method according to the third aspect has the advantage that, during a braking process of the electric motor, the rotor current and the stator current of the electric motor can be set precisely and independently of one another.

As a result, the rotor current can advantageously be limited to a predetermined current level and the stator current can be regulated independently of this, so that it is possible to brake the electric motor within a prespecified time period, but with a high braking torque, in a way that protects the carbon brushes. At the same time, due to the limited rotor current and the adjustable stator current, brush sparking and heating of the electric motor can be reduced. As a result, carbon brush wear of the electric motor can be reduced. This leads to longer maintenance intervals for the electric motor and thus to an increased service life of the electric motor of the electric handheld power tool.

A further advantage of this control method is that the respective semiconductor components can be moved to a conductive state or to a non-conductive state at any time during motor operation and/or during braking operation. Therefore, braking operation can be immediately initiated during motor operation in the event of wedging of the drilling tool. This increases the safety for an operator of the electric handheld power tool.

One advantage of the electric drive unit is that the actuating circuit of the electric drive unit has a small number of semiconductor components, in particular compared to conventional drive units. As a result, the manufacturing complexity can be reduced, while the fail-safety of the electric drive unit is increased due to the small number of semiconductor components.

When the respective semiconductor component is moved to a conductive state, a current can flow through the semiconductor component. When the respective semiconductor component is moved to a non-conductive state, no current can flow through the semiconductor component.

By moving the first semiconductor component to the non-conductive state in the first step of the control method, the electric motor is preferably switched over from motor operation to braking operation and a supply current flow is interrupted as a result.

The supply current flow is preferably not interrupted within the scope of actuating the first semiconductor component with a PWM signal, as is used during motor operation for example. The period of time during which the supply current flow is interrupted is, in particular, several times greater than a period duration of the PWM signal.

The period duration of the PWM signal comprises at least one pulse (high level) and one zero pulse (low level). The duty cycle preferably indicates the ratio of the pulse duration or the pulse of the PWM signal to the period duration of the PWM signal. For example, the pulse duration (high level) with a duty cycle of 0.5 is 50% of the period duration. The remaining 50% of the period duration comprises the zero pulse (low level). That is to say, with a PWM signal which has a duty cycle of 0.5 and a period duration of 100 μs, the PWM signal outputs a pulse or a high level for a period of time of 50 μs and outputs a zero pulse or a low level for a period of time of 50 μs.

A control connection of the respective semiconductor component, such as for example the first semiconductor component, is actuated in particular by means of the high level of the PWM signal or the low level of the PWM signal. If, for example, the respective semiconductor component is a bipolar transistor, the control connection is in the form of a base connection. As an alternative, if the respective semiconductor component is in the form of a MOSFET or an IGBT, the control connection is in the form of a gate connection.

If, in particular, a high level is applied to the control connection of the respective semiconductor component, the respective semiconductor component is moved to a conductive state. If, on the other hand, a low level is applied to the control connection of the respective semiconductor component, the respective semiconductor component is moved to a non-conductive state. It should be noted that reverse logic can also be used, where the roles of the high level and the low level are reversed.

A fourth aspect proposes a control method for controlling an electric drive unit for an electric handheld power tool. The electric drive unit comprises an electric motor comprising a stator winding and a rotor winding, an actuating circuit for actuating the electric motor and a connection unit for coupling an energy source for driving the electric motor. The stator winding is connected via a first node to a stator-side first half-bridge comprising a first semiconductor component and a second semiconductor component and is connected via a second node to the rotor winding. The drive circuit comprises a third semiconductor component which is connected via the second node to the rotor winding and the stator winding and is connected via a fourth node directly to the connection unit. The rotor winding is connected to a third node which is connected via a fourth semiconductor component to the connection unit. The actuating circuit further has a fifth semiconductor component which is connected via the third node to the rotor winding and which is connected via a fifth node directly to the connection unit. The control method according to the fourth aspect has four steps:

In a first step of the control method, the first semiconductor component and/or the fourth semiconductor component are/is moved to a non-conductive state in order to switch the electric motor from motor operation to braking operation. In a second step of the control method, the third semiconductor component and the fifth semiconductor component are moved to a conductive state in order to reverse the polarity of an input voltage applied to the rotor winding compared to motor operation. In a third step of the control method, the fourth semiconductor component and the fifth semiconductor component are moved alternately in synchronism with opposite senses to a conductive state and to a non-conductive state as a function of a predetermined threshold value for a rotor current through the rotor winding in order to limit the rotor current. In a fourth step of the control method, the first semiconductor component is alternately moved to a conductive state and to a non-conductive state in order to regulate a stator current through the stator winding as a function of a current rotation speed of the electric motor.

The targeted actuation of the respective semiconductor components of the electric drive unit according to the control method according to the fourth aspect has the advantage that, during a braking process of the electric motor, the rotor current and the stator current of the electric motor can be set precisely and independently of one another.

As a result, the rotor current can advantageously be limited to a predetermined current level and the stator current can be regulated independently of this, so that it is possible to brake the electric motor within a prespecified time period, but with a high braking torque, in a way that protects the carbon brushes. At the same time, due to the limited rotor current and the adjustable stator current, brush sparking and heating of the electric motor can be reduced. As a result, carbon brush wear of the electric motor can be reduced. This leads to longer maintenance intervals for the electric motor and thus to an increased service life of the electric motor of the electric handheld power tool.

A further advantage of this control method is that the respective semiconductor components can be moved to a conductive state or to a non-conductive state at any point in time during motor operation and/or during braking operation. Therefore, braking operation can be immediately initiated during motor operation in the event of wedging of the drilling tool. This increases the safety for an operator of the electric handheld power tool.

The expression "alternately in synchronism with opposite senses" means, in particular, that two semiconductor components, such as the fourth semiconductor component and the fifth semiconductor component, are switched alternately in such a way that, for example, the fourth semiconductor component is in a conductive state while at the same time the fifth semiconductor component is in a non-conductive state, or vice versa.

According to one embodiment of the third or fourth aspect, the first, the second, the third, the fourth and/or the fifth semiconductor component are/is in the form of a bipolar transistor, in particular in the form of an IGBT, or in the form of a MOSFET.

An IGBT is a bipolar transistor with an insulated gate electrode. In particular, a protective diode (freewheeling diode) is arranged in parallel with the respective semiconductor component in the reverse direction with respect to a supply current of the energy source. Freewheeling diodes are preferably used to protect against an overvoltage when switching off an inductive DC voltage load, such as for example an electric motor. If the respective semiconductor component is in the form of a bipolar transistor, the freewheeling diode is connected in parallel with the collector connection and the emitter connection of the bipolar transistor. If, on the other hand, the respective semiconductor component is in the form of a MOSFET, the freewheeling diode is connected in parallel with the drain connection and the source connection of the MOSFET. For example, a respective rotor current or stator current can decay via a respective freewheeling diode.

The second semiconductor component is preferably in the form of a passive component, such as a diode. This simplifies the design of the actuating circuit and reduces the manufacturing complexity compared to an active component, such as a bipolar transistor or a MOSFET. Furthermore, the third semiconductor component can be in the form of a thyristor. This likewise reduces the manufacturing complexity.

According to the third and fourth aspect, the electric drive unit preferably has at least one first current measuring unit for determining the rotor current and one second current measuring unit for determining the stator current.

According to one embodiment of the third or fourth aspect, the electric drive unit is operated by means of a DC voltage source, a pulsating DC voltage source or an AC voltage source with a rectifier.

The energy source is preferably an AC voltage source with a rectifier, it additionally being possible for a smoothing capacitor to be provided.

According to one embodiment of the third or fourth aspect, the actuating circuit comprises a plurality of driver circuits, with each semiconductor component being assigned a driver circuit for outputting a respective control signal for actuating the respective semiconductor component.

This actuation of the semiconductor components by the actuating circuit by means of the respective driver circuit makes it possible for the rotor current and the stator current of the electric motor to be set precisely and independently of one another during a braking process of the electric motor. The respective control signal is, in particular, a PWM (pulse-width-modulation) signal.

BRIEF DESCRIPTION OF THE DRAWINGS

The following description explains the invention with reference to exemplary embodiments and figures, in which.

Identical or functionally identical elements are indicated by the same reference signs in the figures, unless stated otherwise.

DETAILED DESCRIPTION

Figure 1:
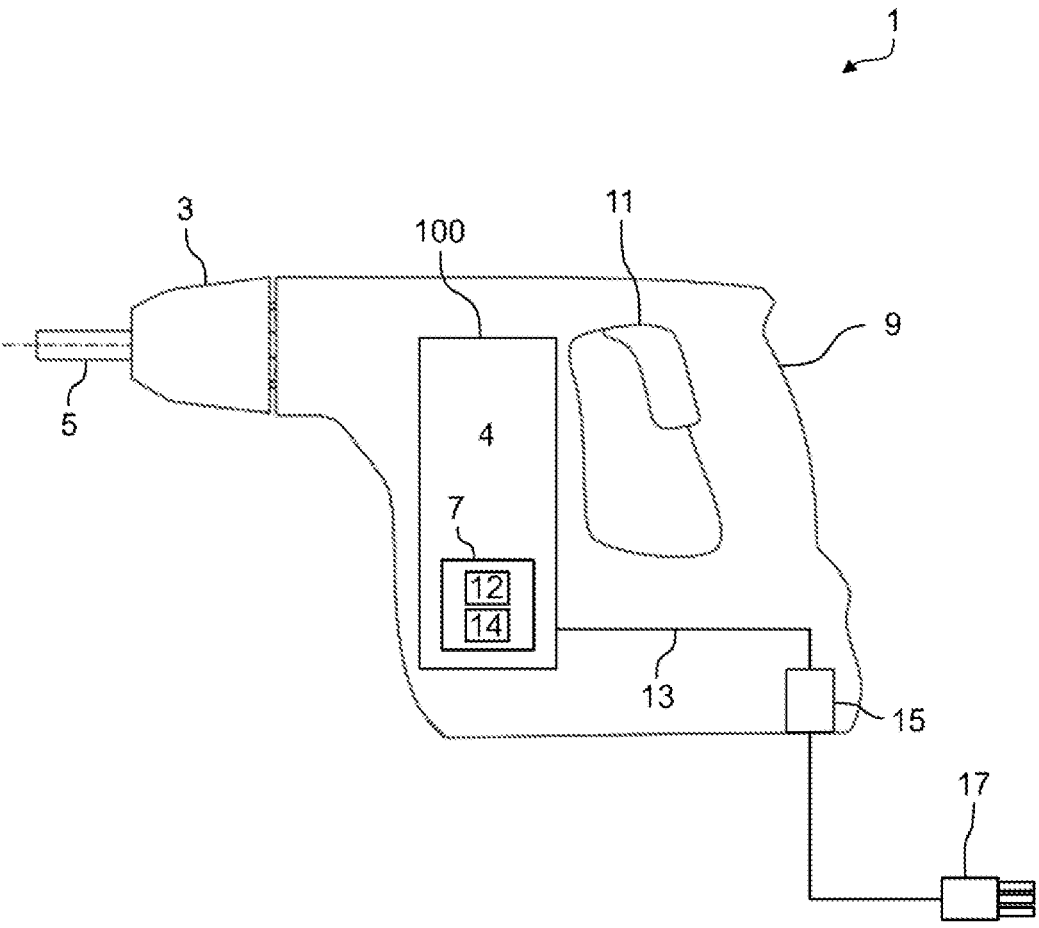
FIG. 1 shows a schematic view of an electric handheld power tool.

FIG. 1 shows a schematic view of an electric handheld power tool 1 which is in the form of a drill by way of example. The drill 1 has a tool fitting 3 in which a drill bit is inserted as a drilling tool 5. A primary drive of the drill 1 is an electric motor 7 having a stator winding 12 and a rotor winding 14. An operator can guide the drill 1 by means of a handle 9 and put it into operation by means of a button 11. During operation, the drill 1 rotates the drill bit 5 continuously about a working axis and in so doing can drill the drill bit 5 along the working axis into a substrate.

The drill 1 has an electric drive unit 100 in FIG. 1. The electric drive unit 100 comprises the electric motor 7 and an actuating circuit 4 for actuating the electric motor 7. The electric drive unit 100 is coupled via an electrical line arrangement 13 to a connection terminal 15 which can be coupled to a power grid by means of a plug 17. As an alternative, the drill 1 can also be supplied with power via a rechargeable battery. The drive train includes, for example, a drive shaft and a transmission between the electric motor 7 and the drive shaft. The transmission can adapt, for example, a rotation speed n(t) (see FIG. 4) of the electric motor 7 to a desired rotation speed of the drill bit 5.

Figure 2A:
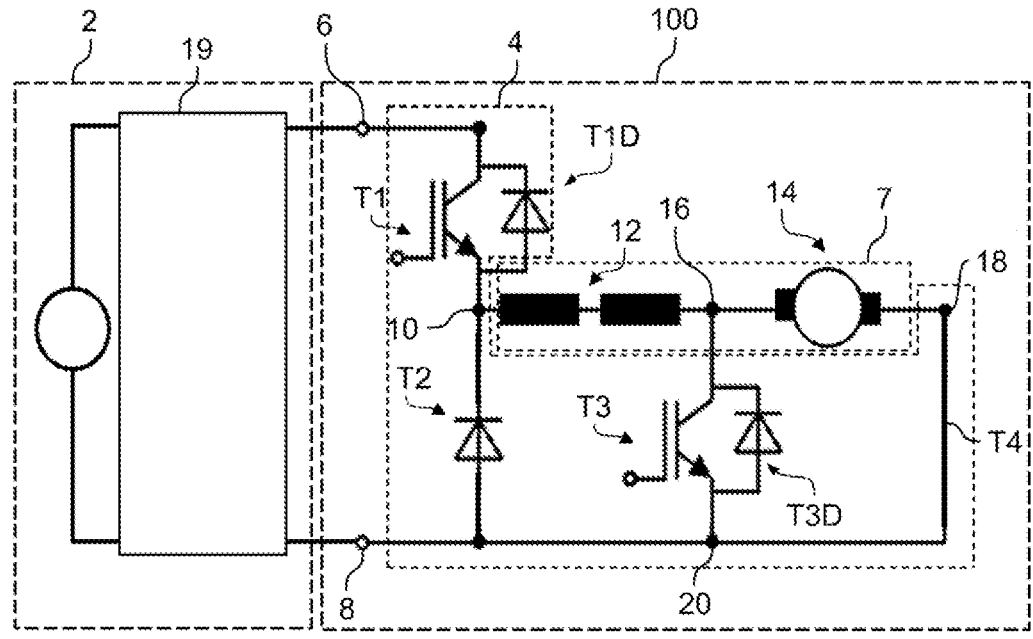
FIG. 2A shows a schematic view of a first embodiment of a circuit topology of an electric drive unit.

FIG. 2A shows a schematic view of a first specific embodiment of a circuit topology of an electric drive unit 100 which can be used, for example, in the electric handheld power tool 1 according to FIG. 1.

The electric drive unit 100 of FIG. 2A has an electric motor 7 which comprises a stator winding 12 and a rotor winding 14. The electric drive unit 100 further has an actuating circuit 4 for actuating the electric motor 7. Furthermore, the electric drive unit 100 has a connection unit 6, 8 for coupling an energy source 2 for driving the electric motor 7. In FIG. 2A, the energy source 2 is in the form of an AC voltage source with a rectifier 19 by way of an example. It is likewise possible, in particular, for the energy source 2 to be in the form of a DC voltage source or in the form of a pulsating DC voltage source.

Furthermore, in FIG. 2A, the stator winding 12 is connected via a first node 10 to a stator-side first half-bridge which comprises a first semiconductor component T1 and a second semiconductor component T2. In addition, the stator winding 12 is connected via a second node 16 to the rotor winding 14. The rotor winding 14 is connected to a third node 18 which is connected via a conductive component T4 to a second connection 8 of the connection unit 6, 8. The energy source 2 has, in particular, a first pole, preferably a positive pole, which is connected to a first connection 6 of the connection unit 6, 8. The energy source 2 further comprises a second pole, in particular a negative pole, which is connected to the second connection 8 of the connection unit 6, 8. The actuating circuit 4 comprises a third semiconductor component T3 which is connected via the second node 16 to the rotor winding 14 and the stator winding 12 and which is connected via a fourth node 20 directly to the second connection 8 of the connection unit 6, 8. In addition, the first semiconductor component T1 and the third semiconductor component T3 have a respective freewheeling diode T1D, T3D connected in parallel. In FIG. 2A, the second semiconductor component T2 is in the form of a diode. An anode connection of the diode is connected to the second connection 8 of the connection unit 6, 8. The diode is therefore arranged in particular in the reverse direction with respect to a supply current of the energy source 2. Furthermore, in FIG. 2A, the first semiconductor component T1 and the third semiconductor component T3 are each in the form of an IGBT by way of example.

Figure 2B:
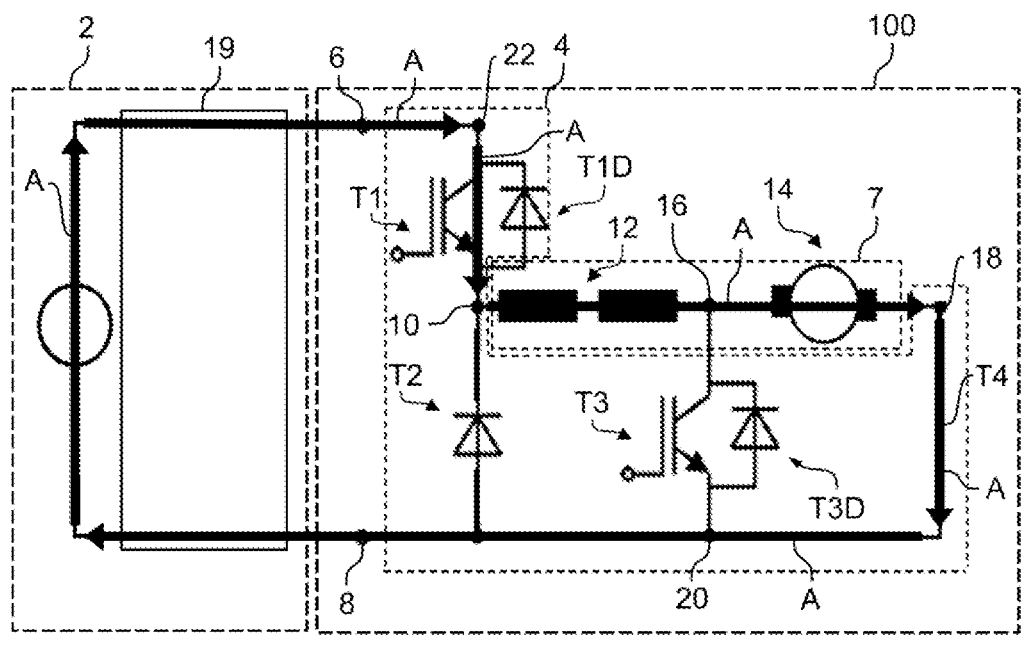
FIG. 2B shows a schematic current flow diagram during motor operation of an electric motor within the circuit topology of the electric drive unit according to FIG. 2A.

FIG. 2B shows a schematic current flow diagram of a supply current which is generated in the energy source 2 during motor operation of an electric motor 7 within the circuit topology of the electric drive unit 100 according to FIG. 2A. During motor operation (drive situation), the conductive component T4 is permanently in a conductive state and the third semiconductor component T3 is permanently in a non-conductive state, so that the stator winding 12 is connected in series with the rotor winding 14. The electric motor 7 is operated as a series-wound machine here. The level of the supply current through the stator winding 12 and the rotor winding 14 and thus also the current rotation speed n(t) (see FIG. 4) of the electric motor 7 are regulated in particular by moving the first semiconductor component T1 alternately to a conductive state and to a non-conductive state.

In FIG. 2B, when the electric motor 7 is being driven, the supply current flows, as shown in FIG. 2B by the arrows A, from the energy source 2 via a first connection 6 of the connection unit 6, 8 and via a fifth node 22 through the first semiconductor component T1, from the first semiconductor component T1 via a first node 10 through the stator winding 12, from the stator winding 12 via a second node 16 through the rotor winding 14 to a third node 18, from the third node 18 through the conductive component T4 via a fourth node 20 and via a second connection 8 of the connection unit 6, 8 back to the energy source 2. The fifth node 22 is connected to the first connection 6 of the connection unit 6, 8. The fourth node 22 is connected to the second connection 8 of the connection unit 6, 8.

Figure 2C:
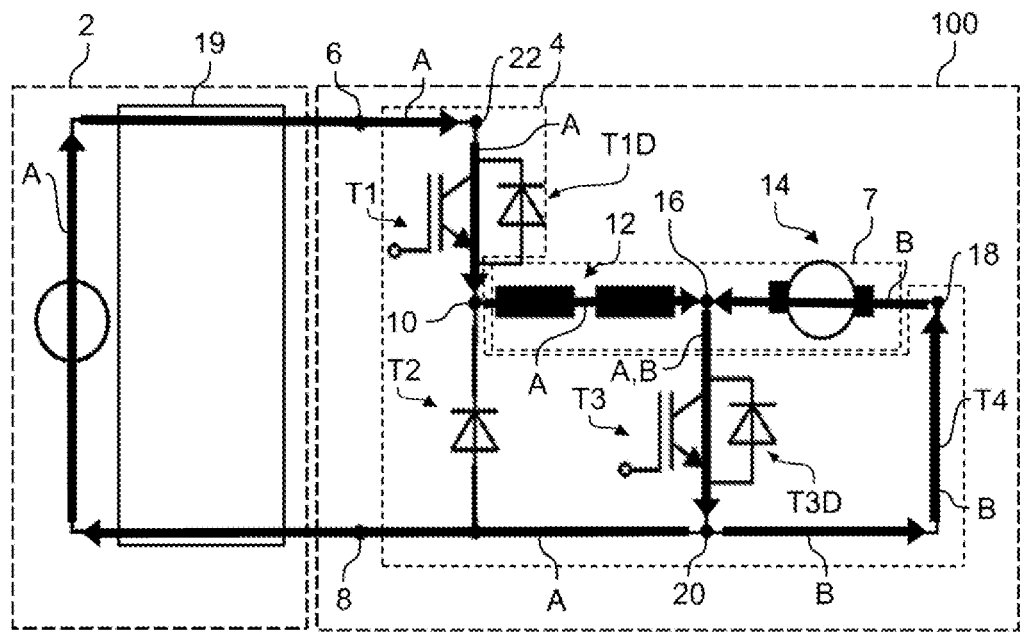
FIG. 2C shows a schematic current flow diagram during braking operation of an electric motor within the circuit topology of the electric drive unit according to FIG. 2A.

FIG. 2C shows a schematic current flow diagram during braking operation of an electric motor 7 within the circuit topology of the electric drive unit 100 according to FIG. 2A. During braking operation, the respective semiconductor components are actuated as follows:

In a first step, the first semiconductor component T1 is moved to a non-conductive state in order to switch the electric motor 7 from motor operation to braking operation. The supply current flow is interrupted by moving the first semiconductor component T1 to a non-conductive state. In a second step, the third semiconductor component T3 is moved to a conductive state in order to connect the rotor winding 14 in parallel with the stator winding 12. In a third step, the first semiconductor component T1 is moved to a conductive state in order to provide a magnetic flux, so that a voltage is induced at the rotor winding 14 in the opposite direction compared to a voltage applied to the rotor winding 14 during motor operation of the electric motor 7. In a fourth step, the first semiconductor component T1 is moved to a non-conductive state as a function of a predetermined threshold value $I_L$ (see FIG. 4) for a rotor current $I_R(t)$ (see FIG. 4) through the rotor winding 14 in order to limit the rotor current $I_R(t)$. The rotor current $I_R(t)$ is preferably limited to a predetermined threshold value. For example, a current measuring unit (not shown) is provided for this purpose, which is designed in order to monitor the rotor current $I_R(t)$. In a fifth step, the first semiconductor component T1 is alternately moved to a conductive state and to a non-conductive state in order to regulate a stator current $I_S(t)$ (see FIG. 4) through the stator winding 12 as a function of a current rotation speed n(t) (see FIG. 4) of the electric motor 7. The stator current $I_S(t)$ is preferably regulated to a rotation speed-dependent value. For example, a further current measuring unit (not shown) is provided for this purpose, which is designed in order to monitor the stator current $I_R(t)$. When the rotation speed $n(t)$ of the electric motor 7 has reached a predetermined threshold value, the electric motor 7 is preferably completely disconnected from the energy source 2. This concludes the braking process.

During braking operation, the third semiconductor component T3 in particular is permanently in a conductive state. As a result, the stator winding 12 and the rotor winding 14 are no longer connected in series. The electric motor 7 is therefore operated as a shunt-wound machine and no longer as a series-wound machine (see FIG. 2B). The voltage induced at the rotor winding 14, in particular during braking operation, is preferably caused by a rotor current $I_R(t)$ induced according to Lenz's law in the rotor winding 14. Since this flow of current is directed in such a way that the magnetic field caused by it counteracts its cause, a braking torque is produced, which counteracts the rotation of the rotor. Thus, the electric motor 7 is braked.

During braking operation, a supply current flows, as shown by the arrows A in FIG. 2C, from the energy source 2 via a first connection 6 of the connection unit 6, 8 and via a fifth node 22 through the first semiconductor component T1, from the first semiconductor component T1 via a first node 10 through the stator winding 12, from the stator winding 12 via a second node 16 through the third semiconductor component T3, from the third semiconductor component T3 via a fourth node 20 and via a second connection 8 of the connection unit 6, 8 back to the energy source 2. At the same time, an induced current flows in the rotor winding 14, which induced current is shown by the arrows B in FIG. 2C. The induced current is directed opposite to the supply current. This oppositely directed current flows from the second node 16 through the third semiconductor component T3 to a fourth node 20, from the fourth node 20 through the conductive component T4 to a third node 18, and from the third node 18 through the rotor winding 14 back to the second node 16.

Figure 3A:
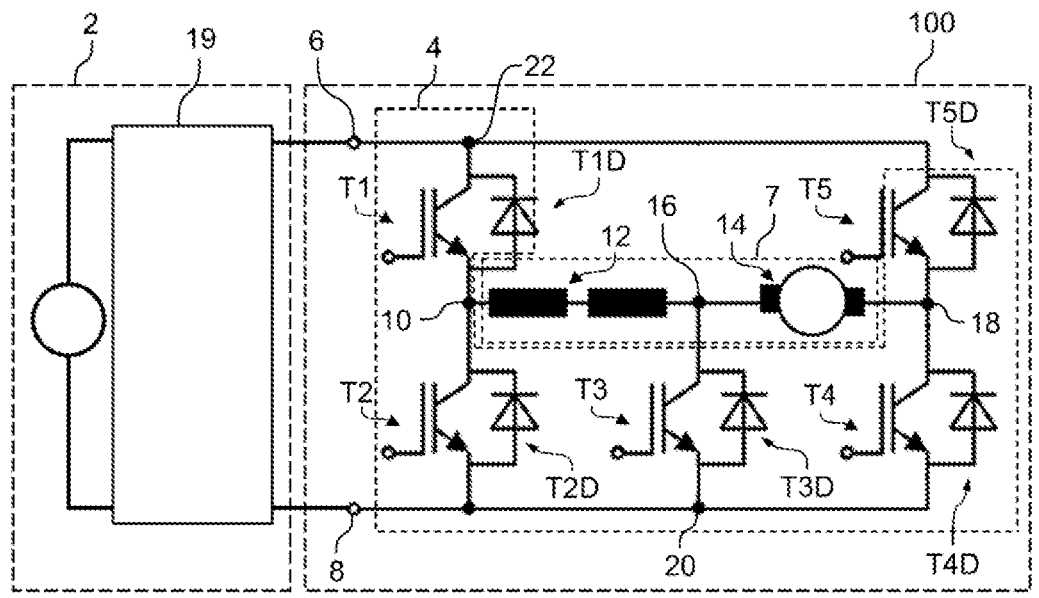
FIG. 3A shows a schematic view of a second embodiment of a circuit topology of an electric drive unit.

FIG. 3A shows a schematic view of a second embodiment of a circuit topology of an electric drive unit 100 which can be used, for example, in the electric handheld power tool 1 according to FIG. 1.

The electric drive unit 100 of FIG. 3A has a similar structure to the electric drive unit 100 of FIG. 2A. Only the differences from the electric drive unit 100 of FIG. 2A are explained below. In addition to FIG. 2A, the electric drive unit 100 of FIG. 3A has a fifth semiconductor component T5. By way of example, said fifth semiconductor component is in the form of an IGBT with a freewheeling diode T5D connected in parallel with it. The fifth semiconductor component T5 is connected via a third node 18 to the rotor winding 14 and is connected via a fifth node 22 directly to a first connection 6 of the connection unit 6, 8. Furthermore, the conductive component T4 in FIG. 3A is in the form of a fourth semiconductor component T4 and likewise, by way of example, in the form of an IGBT with a freewheeling diode T4D connected in parallel with it. The second semiconductor component T2 in FIG. 3 is also in the form of an IGBT with a freewheeling diode T2D connected in parallel with it.

Figure 3B:
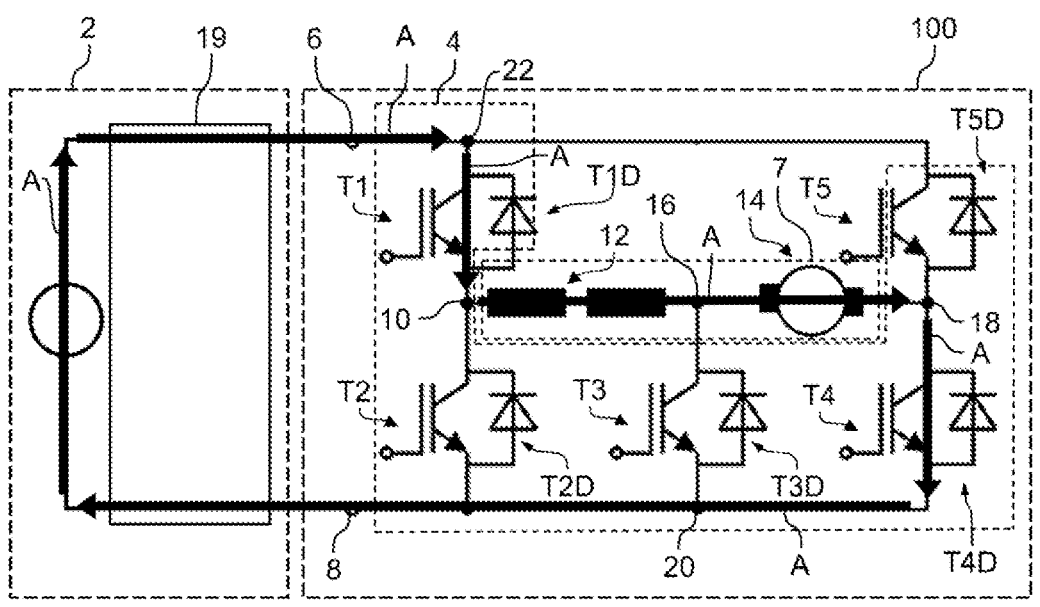
FIG. 3B shows a schematic current flow diagram during motor operation of an electric motor within the circuit topology of the electric drive unit according to FIG. 3A.

FIG. 3B shows a schematic current flow diagram of a supply current during motor operation of an electric motor 7 within the circuit topology of the electric drive unit 100 according to FIG. 3A. The feed current flow during motor operation in FIG. 3B is identical to the feed current flow during motor operation in FIG. 2B, for which reason an explanation is omitted here. It should be noted that the fourth semiconductor component T4 is permanently in a conductive state in this case. Furthermore, the second semiconductor component T2 and the fifth semiconductor component T5 are permanently in a non-conductive state during motor operation.

Figure 3C:
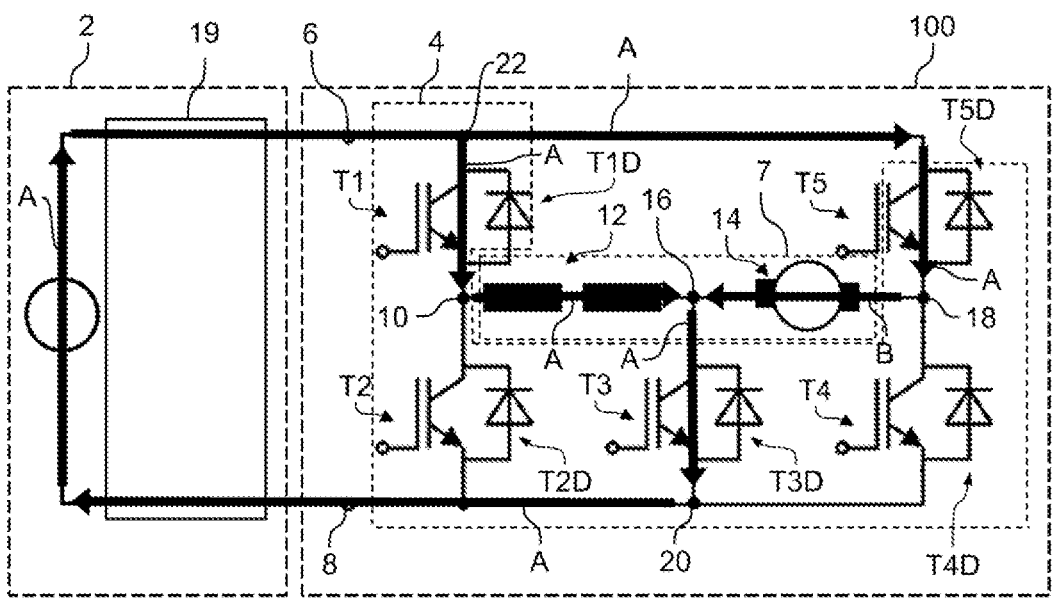
FIG. 3C shows a schematic current flow diagram during braking operation of an electric motor within the circuit topology of the electric drive unit according to FIG. 3A.

FIG. 3C shows a schematic current flow diagram during braking operation of an electric motor 7 within the circuit topology of the electric drive unit 100 according to FIG. 3A. During braking operation, the respective semiconductor components are actuated as follows:

In a first step, the first semiconductor component T1 and/or the fourth semiconductor component T4 are/is moved to a non-conductive state in order to switch the electric motor 7 from motor operation to braking operation. In a second step, the third semiconductor component T3 and the fifth semiconductor component T5 are moved to a conductive state in order to reverse the polarity of an input voltage applied to the rotor winding 14 compared to motor operation. In a third step, the fourth semiconductor component T4 and the fifth semiconductor component T5 are moved as a function of a predetermined threshold value $I_L$ (see FIG. 4) for a rotor current $I_R(t)$ (see FIG. 4) through the rotor winding 14 alternately in synchronism with opposite senses to a conductive state and to a non-conductive state in order to limit the rotor current $I_R(t)$. The rotor current $I_R(t)$ is preferably limited to a predetermined threshold value. For example, a current measuring unit (not shown) is provided for this purpose, which is designed in order to monitor the rotor current $I_R(t)$. The fourth semiconductor component T4 and the fifth semiconductor component T5 form, in particular, a rotor-side second half-bridge. In a fourth step, the first semiconductor component T1 is alternately moved to a conductive state and to a non-conductive state in order to regulate a stator current $I_S(t)$ (see FIG. 4) through the stator winding 12 as a function of a current rotation speed $n(t)$ (see FIG. 4) of the electric motor 7. The stator current $I_S(t)$ is preferably regulated to a rotation speed-dependent value. For example, a further current measuring unit (not shown) is provided for this purpose, which is designed in order to monitor the stator current $I_R(t)$.

During braking operation, the third semiconductor component T3 in particular is permanently in a conductive state. As a result, the stator winding 12 and the rotor winding 14 are no longer connected in series. The electric motor 7 is therefore operated as a shunt-wound machine and no longer as a series-wound machine (see FIG. 3B). The stator current $I_S(t)$ through the stator winding 12 (as in the drive situation) is regulated in particular by the stator-side first half-bridge comprising the first semiconductor component T1 and the second semiconductor component T2. The rotor current $I_R(t)$ through the rotor winding 14 is regulated by the rotor-side second half-bridge comprising the fourth semiconductor component T4 and the fifth semiconductor component T5. A voltage induced at the rotor winding 14 is preferably caused by a rotor current $I_R(t)$ induced according to Lenz's law during braking operation in the rotor winding 14. The induced rotor current $I_R(t)$ in the rotor winding 14 is caused in particular by the polarity reversal (see above, second step) of the input voltage at the rotor winding 14. Since this flow of current is directed in such a way that the magnetic field caused by it counteracts its cause, a braking torque is produced, which counteracts the rotation of the rotor. Thus, the electric motor 7 is braked.

During braking operation of the electric motor 7, a supply current flows, as shown by the arrows A in FIG. 3C, from the energy source 2 via a first connection 6 of the connection unit 6, 8 and via a fifth node 22 through the first semiconductor component T1, from the first semiconductor component T1 via a first node 10 through the stator winding 12, from the stator winding 12 via a second node 16 through the third semiconductor component T3, from the third semiconductor component T3 via a fourth node 20 and via a second connection 8 of the connection unit 6, 8 back to the energy source 2. In addition, the feed current flows from the energy source 2 via the first connection 6 of the connection unit 6, 8 via the fifth node 22 through the fifth semiconductor component T5 to a third node 18. Due to the polarity reversal of the input voltage (see above, second step) at the rotor winding 14, the supply current now flows through the rotor winding in the opposite direction (compared to motor operation). At the same time, a current is induced in the rotor winding 14, which current flows in the same direction, so that the two currents are added up in terms of absolute value. As shown by arrow B in FIG. 3C, the induced current flows from the third node 18 through the rotor winding 14 to the second node 16.

The following applies in particular to FIGS. 3A-3C: if, for example, the supply current through the stator-side first half-bridge becomes too high, the first semiconductor component T1 is moved to a non-conductive state and the second semiconductor component T2 is moved to a conductive state, so that the supply current can decay across the latter. If, on the other hand, in particular the current through the rotor-side second half-bridge, which current is composed in particular of the supply current and the induced current, becomes too high, the fifth semiconductor component T5 is moved to a non-conductive state and the fourth semiconductor component T4 is moved to a conductive state, so that the current can decay across the latter.

Figure 4:
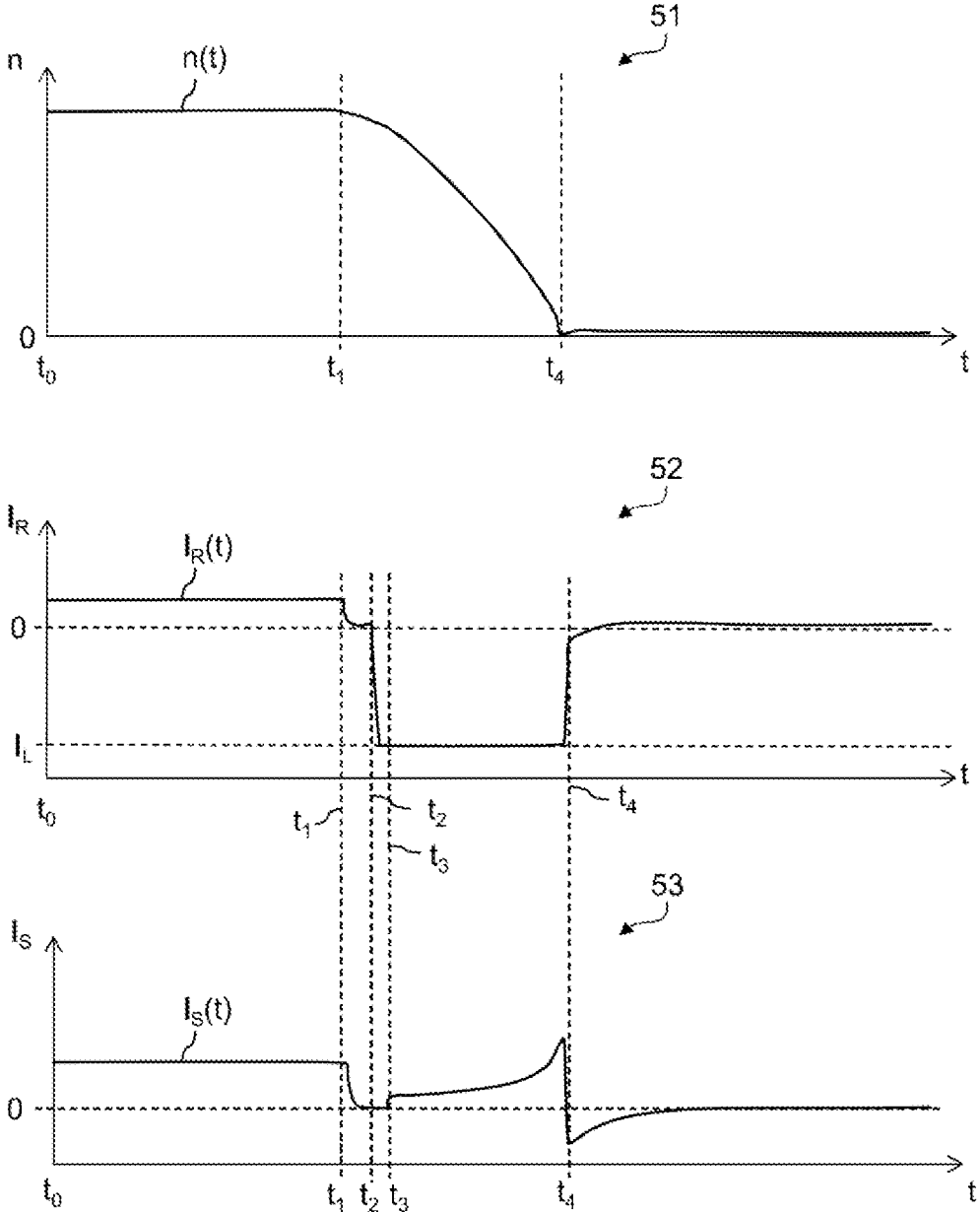
FIG. 4 shows a schematic diagram of a sequence of a control method for braking an electric motor.

FIG. 4 shows a schematic diagram of a sequence of a control method for braking an electric motor 7 (see FIGS. 1, 2A, 2B, 2C, 3A, 3B, 3C), for example an electric motor 7 of the electric handheld power tool 1 according to FIG. 1. The schematic diagram of FIG. 4 comprises three graphs 51, 52 and 53. A first graph 51 shows the profile of the current rotation speed n of the electric motor 7 (vertical axis) as a function of time t (horizontal axis). A second graph 52 shows the profile of the rotor current $I_R$ in the electric motor 7 (vertical axis) as a function of time t (horizontal axis). A third graph 53 shows the profile of the stator current Is in the electric motor 7 (vertical axis) as a function of time t (horizontal axis).

Initially, the electric handheld power tool 1 is in motor operation (time interval between $t_0$ and $t_1$). In particular, a rotor current $I_R(t)$ (see second graph 52, time interval between $t_0$ and $t_1$) flows through a rotor winding 14 (see FIGS. 1, 2A, 2B, 2C, 3A, 3B, 3C) as a function of a target rotation speed of the electric motor 7 and a stator current $I_S(t)$ (see third graph 53, time interval between $t_0$ and $t_1$) flows through a stator winding 12 (see FIGS. 1, 2A, 2B, 2C, 3A, 3B, 3C) as a function of the target rotation speed of the electric motor 7.

If, for example, the drilling tool 5 (see FIG. 1) of the electric handheld power tool 1 becomes wedged in a rebar during motor operation when working with the electric handheld power tool 1, this is detected by a sensor, such as a gyro sensor, as an operation interruption state of the electric handheld power tool 1.

The operation interruption state is detected at time $t_1$, in the case of which the electric motor 7 is switched over from motor operation to braking operation. For this purpose, for example, a supply current flow through the stator winding 12 and/or the rotor winding 14 is interrupted. After the switching over, the system waits for the rotor current $I_R(t)$ to decay, this taking place, for example, in a few milliseconds. The rotor current $I_R(t)$ is considered to have decayed when it reaches or falls below a predetermined switching threshold value. In the present case, the predetermined switching threshold value is 0 A, which is reached at time $t_2$ (see second graph 52).

Then, for example, the polarity of an input voltage at the rotor winding 14 is reversed. As a result, the rotor current $I_R(t)$ flows in the opposite direction(compared to the time interval between $t_0$ and $t_1$) and rises. The rotor current $I_R(t)$ of the rotor winding 14 is then limited as a function of a predetermined threshold value $I_L$ (see second graph 52). In particular, the rotor current is limited or regulated to a constant value or a value which is variable over time, in particular a value which is dependent on the rotation speed. In FIG. 4, the second graph 52 shows, starting from time $t_2$, that the rotor current $I_R(t)$ rises to −20 A after the polarity reversal (corresponds in particular to the predetermined threshold value $I_L$) and is limited to this value. For example, in the embodiment shown in FIG. 3A, the limiting is carried out by means of moving a fourth semiconductor component T4 (see FIGS. 3A, 3B, 3C) and a fifth semiconductor component T5 (see FIGS. 3A, 3B, 3C) alternately in synchronism with opposite senses to a conductive state and to a non-conductive state as a function of the predetermined threshold value $I_L$ for the rotor current $I_R(t)$.

After the polarity of the input voltage at the rotor winding 14 has been reversed (see above), the system waits, for example, for a predetermined period of time to elapse (time interval between $t_2$ and $t_3$). The predetermined period of time is, in particular, up to 2 ms or up to 3 ms. It should be noted that waiting for this period of time is not absolutely necessary. During this predetermined period of time, the first semiconductor component T1 (see FIGS. 2A, 2B, 2C, 3A, 3B, 3C) is preferably in a non-conductive state both in the embodiment of FIGS. 2A, 2B and 2C and in the embodiment of FIGS. 3A, 3B and 3C. After the predetermined period of time has elapsed, at time $t_3$, the stator current $I_S(t)$ through the stator winding 12 is increased as a function of the current rotation speed n(t) of the electric motor 7, in particular with a drop in the current rotation speed n(t). This occurs in the time interval between times $t_3$ and $t_4$ in the third graph 53 of FIG. 4. This advantageously results in an increase in the braking torque with which the rotor is braked.

In other words, for example in the first moment after the polarity reversal of the input voltage at the rotor winding 14 has been carried out, the first semiconductor component T1 remains in a non-conductive state. This results in the stator winding 12 remaining unenergized and therefore not rising with the rotor current $I_R(t)$ which rises after the polarity reversal due to the polarity reversal. After the predetermined period of time, which is up to 2 ms or up to 3 ms for example, has elapsed, the first semiconductor component T1 is moved to a conductive state. As a result, the stator winding 12 is energized and can, for example, be increased in a controlled manner with a drop in the current rotation speed n(t) of the electric motor 7 (see the time interval between times $t_3$ and $t_4$ in the third graph 53 of FIG. 4). Owing to this measure, the rotor current $I_R(t)$ and the stator current $I_S(t)$ of the electric motor 7 can be set independently of one another.

Figure 5:
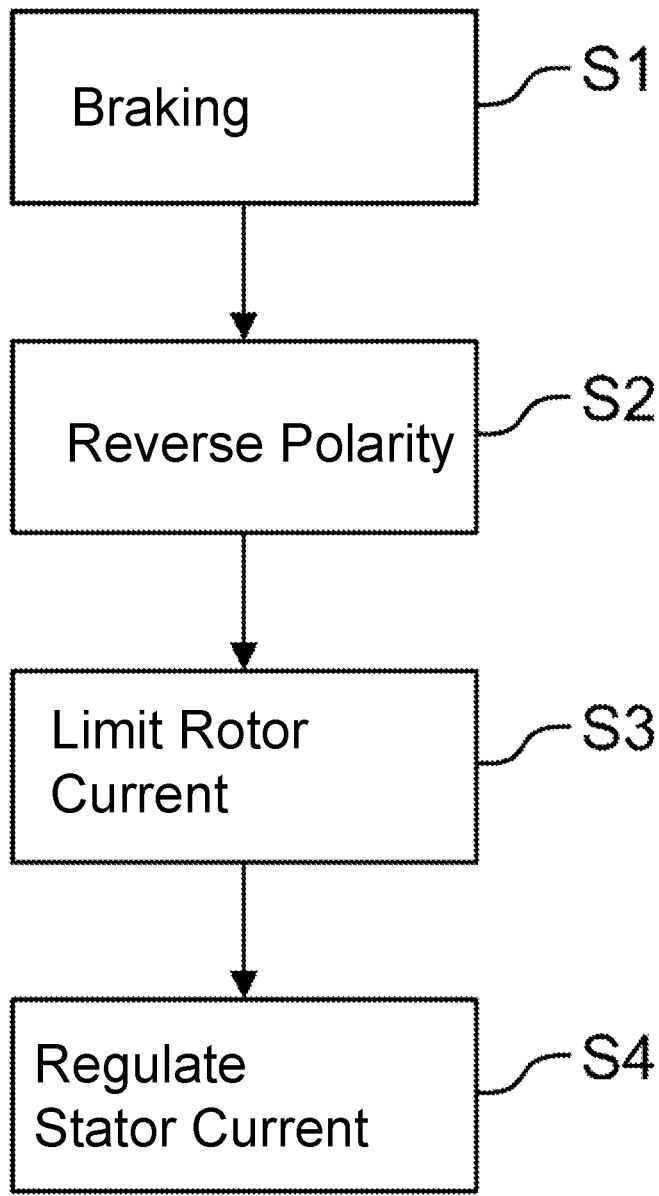
FIG. 5 shows a schematic block diagram of a control method for braking an electric motor.

FIG. 5 shows a schematic block diagram of a control method for braking an electric motor 7 (see FIGS. 1, 2A, 2B, 2C, 3A, 3B, 3C), for example the electric motor 7 of the electric handheld power tool 1 according to FIG. 1.

The electric motor 7 comprises a stator winding 12 (see FIGS. 2A, 2B, 2C, 3A, 3B, 3C) and a rotor winding 14 (see FIGS. 2A, 2B, 2C, 3A, 3B, 3C). The control method in FIG. 5 has four steps S1-S4. In a first step S1, the electric motor 7 is switched from motor operation to braking operation (see FIG. 4, time $t_1$). In a second step S2, the polarity of an input voltage applied to the rotor winding 14 is reversed compared to motor operation (see FIG. 4, time $t_2$). In a third step S3, a rotor current $I_R(t)$ (see FIG. 4) of the rotor winding 14 is limited as a function of a predetermined threshold value $I_L$ (see FIG. 4) (see the time interval between times $t_2$ and $t_4$ in the second graph 52 of FIG. 4). In a fourth step S4, a stator current $I_S(t)$ (see FIG. 4) of the stator winding 12 is regulated as a function of a current rotation speed n(t) (see FIG. 4) of the electric motor 7 (see the time interval between times $t_3$ and ta in the third graph 53 of FIG. 4). When the rotation speed n(t) of the electric motor 7 has reached a predetermined threshold value, the electric motor 7 is preferably completely disconnected from the energy source 2. For example, all semiconductor components are moved to the non-conductive state for this purpose.

The control method is carried out, for example, when a predetermined operating state of electric handheld power tool 1 is detected during motor operation of the electric motor 7. Steps S1 to S4 are carried out when this predetermined operating state has been detected.

LIST OF REFERENCE SIGNS

1 Electric handheld power tool
2 Energy source
3 Tool fitting
4 Actuating circuit
5 Drilling tool
6 Connection unit
7 Electric motor
8 Connection unit
9 Handle
10 Nodes
11 Button
12 Stator winding
13 Line arrangement
14 Rotor winding
15 Connection terminal
16 Nodes
17 Plug
18 Nodes
19 Rectifier
20 Nodes
22 Nodes
51 Graph
52 Graph
53 Graph
100 Electric drive unit
A Arrow
B Arrow
$I_L$ Threshold value
$I_R(t)$ Rotor current
$I_S(t)$ Stator current
n(t) Rotation speed
S1-S4 Method steps
t Time
$t_0$ Time
$t_1$ Time
$t_2$ Time
$t_3$ Time
$t_4$ Time
T1 Semiconductor component
T1D Freewheeling diode T2 Semiconductor component
T2D Freewheeling diode
T3 Semiconductor component
T3D Freewheeling diode
T4 Conductive component
T4D Freewheeling diode
T5 Semiconductor component
T5D Freewheeling diode

What is claimed is:

1. A control method for braking an electric motor of an electric handheld power tool, the electric motor having a stator winding and a rotor winding, the control method comprising:
   a) switching the electric motor from motor operation to braking operation;
   b) reversing the polarity of an input voltage applied to the rotor winding compared to motor operation;
   c) limiting a rotor current of the rotor winding as a function of a predetermined threshold value, and
   d) regulating a stator current of the stator winding as a function of a current rotation speed of the electric motor.

2. The control method as recited in claim 1 wherein step b) is carried out as soon as the rotor current reaches or falls below a predetermined switching threshold value.

3. The control method as recited in claim 2 wherein the predetermined switching threshold value is 0 A.

4. The control method as recited in claim 1 wherein step b) further comprises connecting the rotor winding in parallel with the stator winding.

5. The control method as recited in claim 1 wherein step d) includes increasing the stator current as a function of the rotor current or the current rotation speed of the electric motor.

6. The control method as recited in claim 1 wherein step d) is carried out after a predetermined period of time has elapsed after step b) has been carried out.

7. The control method as recited in claim 1 further comprising:
   detecting a predetermined operating state of the electric handheld power tool during motor operation of the electric motor; and
   carrying out steps a)-d) if the predetermined operating state is detected.

8. The control method as recited in claim 7 wherein the predetermined operating state includes at least one operation interruption state.

9. The control method as recited in claim 7 wherein at least one operation interruption state is a wedging of a drilling tool of the electric handheld power tool.

10. The control method as recited in claim 7 wherein the detecting of the predetermined operating state occurs via a sensor, in particular by means of a gyro sensor, of the electric handheld power tool.

11. The control method as recited in claim 10 wherein the sensor is a gyro sensor.

12. A computer program product comprising instructions which, when the program is executed by a computer, cause the computer to execute the control method as recited in claim 1.

13. A control method for controlling an electric drive unit for an electric handheld power tool, the electric drive unit having an electric motor having a stator winding and a rotor winding, an actuating circuit for actuating the electric motor and a connection unit for coupling an energy source for driving the electric motor, the stator winding being connected via a first node to a stator-side first half-bridge including a first semiconductor component and a second semiconductor component and is connected via a second node to the rotor winding, wherein the rotor winding is connected to a third node connected via a conductive component to the connection unit, and wherein the actuating circuit includes a third semiconductor component connected via the second node to the rotor winding and the stator winding and is connected via a fourth node directly to the connection unit, wherein the control method comprises:

a) moving the first semiconductor component to a non-conductive state in order to switch the electric motor from motor operation to braking operation, b) moving the first semiconductor component and the third semiconductor component to a conductive state in order to reverse the polarity of an input voltage applied to the rotor winding compared to motor operation, c) moving the first semiconductor component to a non-conductive state as a function of a predetermined threshold value for a rotor current through the rotor winding in order to limit the rotor current, and d) moving the first semiconductor component alternately to a conductive state and to a non-conductive state in order to regulate a stator current through the stator winding as a function of a current rotation speed of the electric motor.

14. The control method as recited in claim 13 the electric drive unit is operated by means of a DC voltage source, a pulsating DC voltage source or an AC voltage source with a rectifier.

15. A control method for controlling an electric drive unit for an electric handheld power tool, wherein the electric drive unit has an electric motor having a stator winding and a rotor winding, an actuating circuit for actuating the electric motor and a connection unit for coupling an energy source for driving the electric motor, wherein the stator winding is connected via a first node to a stator-side first half-bridge comprising a first semiconductor component and a second semiconductor component and is connected via a second node to the rotor winding, wherein the actuating circuit includes a third semiconductor component connected via the second node to the rotor winding and the stator winding and is connected via a fourth node directly to the connection unit, wherein the rotor winding is connected to a third node connected via a fourth semiconductor component to the connection unit, and wherein the actuating circuit includes a fifth semiconductor component connected via the third node to the rotor winding and via a fifth node directly to the connection unit, wherein the control method comprises:

a) moving the first semiconductor component or the fourth semiconductor component to a non-conductive state in order to switch the electric motor from motor operation to braking operation, b) moving the third semiconductor component and the fifth semiconductor component to a conductive state in order to reverse the polarity of an input voltage applied to the rotor winding compared to motor operation, c) moving the fourth semiconductor component and the fifth semiconductor component to a non-conductive state as a function of a predetermined threshold value for a rotor current through the rotor winding alternately in synchronism with opposite senses to a conductive state and to a non-conductive state in order to limit the rotor current, and d) moving the first semiconductor component alternately to a conductive state and to a non-conductive state in order to regulate a stator current through the stator winding as a function of a current rotation speed of the electric motor.

16. The control method as recited in claim 15 the electric drive unit is operated by means of a DC voltage source, a pulsating DC voltage source or an AC voltage source with a rectifier.

* * * * *